(12) United States Patent  
Gampp et al.

(10) Patent No.: US 6,351,575 B1  
(45) Date of Patent: Feb. 26, 2002

(54) MULTIFUNCTION INTEGRATED OPTICS CHIP HAVING IMPROVED POLARIZATION EXTINCTION RATIO

(75) Inventors: Lorrie L. Gampp, Reseda, CA (US); Gregory Zimmerman, Layton, UT (US); Arthur R. Martinez, Canoga Park, CA (US); Thomas M. Flaherty, Agoura Hills, CA (US); Christine E. Geosling, Calabasas, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/469,665

(22) Filed: Dec. 23, 1999

(51) Int. Cl.[7] ............................................... G02B 6/12
(52) U.S. Cl. ........................................... 385/14; 385/15
(58) Field of Search ................................ 385/15, 8–14, 385/39–45, 50–51, 1–3, 11

(56) References Cited

U.S. PATENT DOCUMENTS

| | | |
|---|---|---|
| 4,976,506 A | 12/1990 | Pavlath |
| 5,046,808 A | 9/1991 | Chang |
| 5,193,136 A | 3/1993 | Chang |
| 5,321,779 A | 6/1994 | Kissa |
| 5,393,371 A | 2/1995 | Chang |
| 5,442,719 A | 8/1995 | Chang |
| 5,475,772 A | 12/1995 | Hung et al. |
| 5,793,093 A * | 8/1998 | Warwick ..................... 257/510 |

* cited by examiner

Primary Examiner—Mohammad Sikder  
(74) Attorney, Agent, or Firm—Lynn & Lynn

(57) ABSTRACT

An integrated optics chip includes an optical waveguide network formed on a surface of an electrooptically active material. The optical waveguide network has an input facet where an optical signal may be input to the optical waveguide network and an output facet where optical signals may be output from the optical waveguide network. One or more trenches is formed in the bottom surface of the surface and arranged to extend into the substrate toward the optical waveguide network to a depth of at least 70% of the thickness. The trenches prevent light rays incident thereon from inside the substrate from propagating to the output facet. In particular, the trenches prevent light scattered at the input facet or from scattering centers in the optical waveguide network from reflecting from the bottom surface of the substrate to the output facet. A cover may be mounted to the top surface of the substrate to provide structural strength to the integrated optics chip. The cover preferably extends substantially the entire length of the substrate. One or more side grooves may be formed in the sides of the substrate and cover. A light absorbing material may be placed in the trenches and grooves. An electrode pattern may be formed on the top surface of the substrate adjacent the optical waveguide network, and a plurality of access electrodes may be formed on sides of the substrate and cover to provide electrical signals to the electrodes.

18 Claims, 4 Drawing Sheets

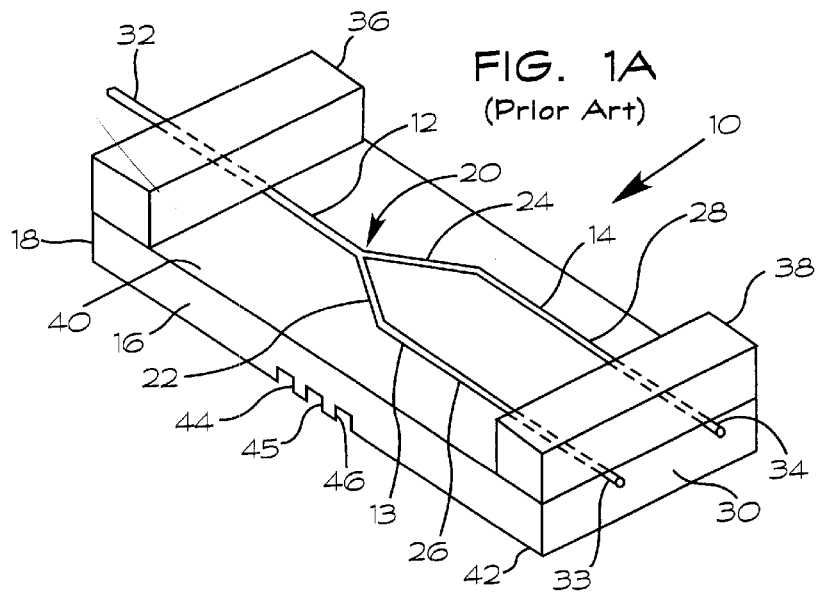
FIG. 1A (Prior Art)
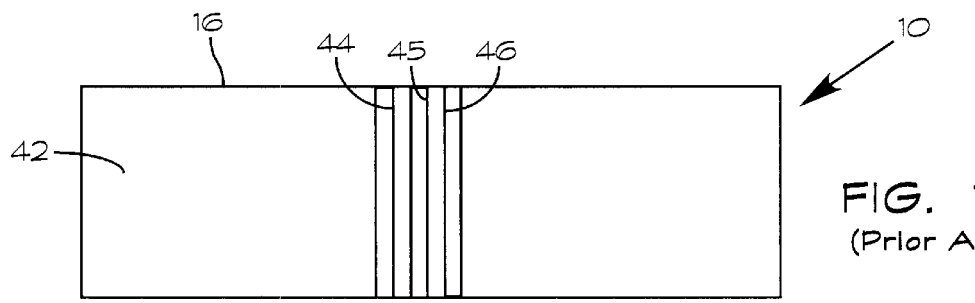
FIG. 1B (Prior Art)
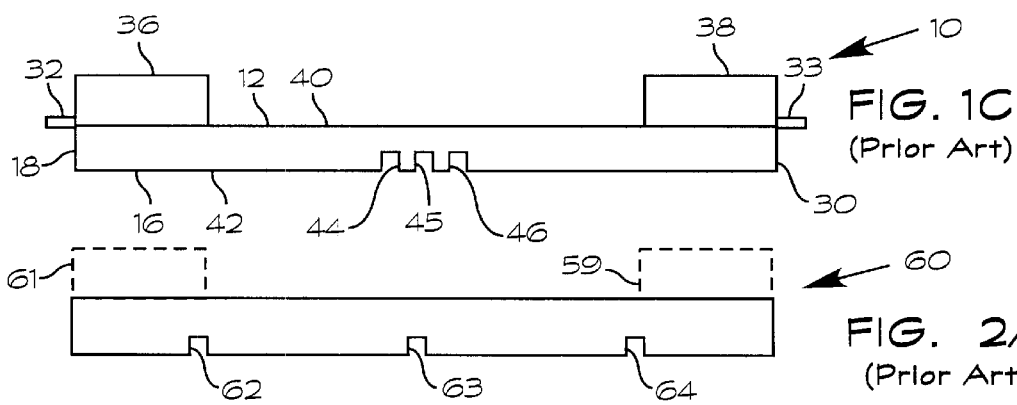
FIG. 1C (Prior Art)
FIG. 2A (Prior Art)
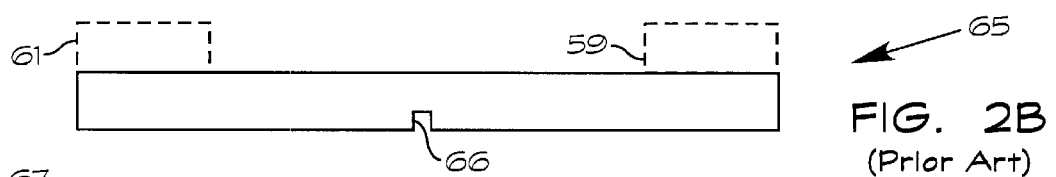
FIG. 2B (Prior Art)
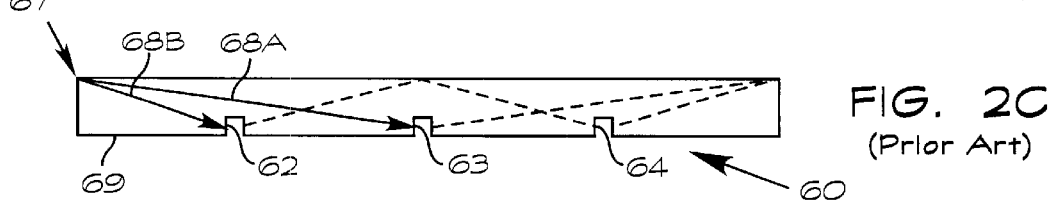
FIG. 2C (Prior Art)

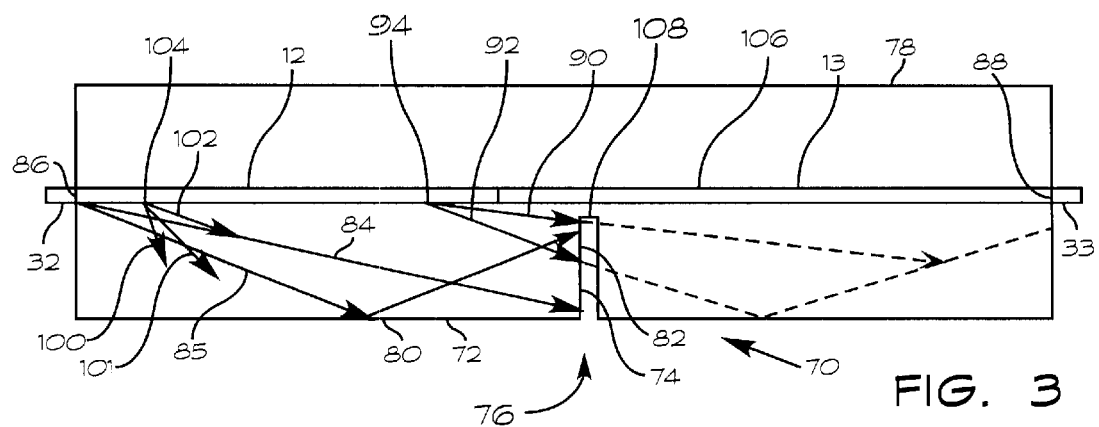
FIG. 3
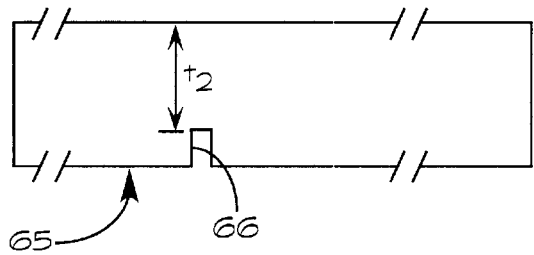
FIG. 4
FIG. 5
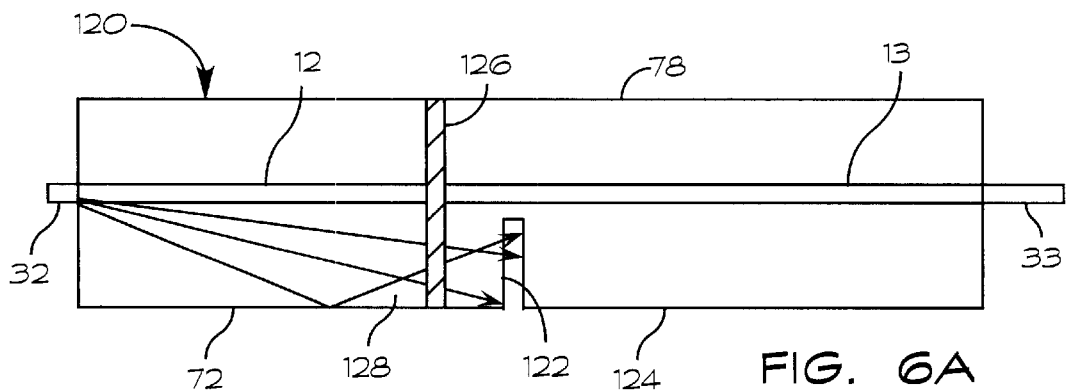
FIG. 6A
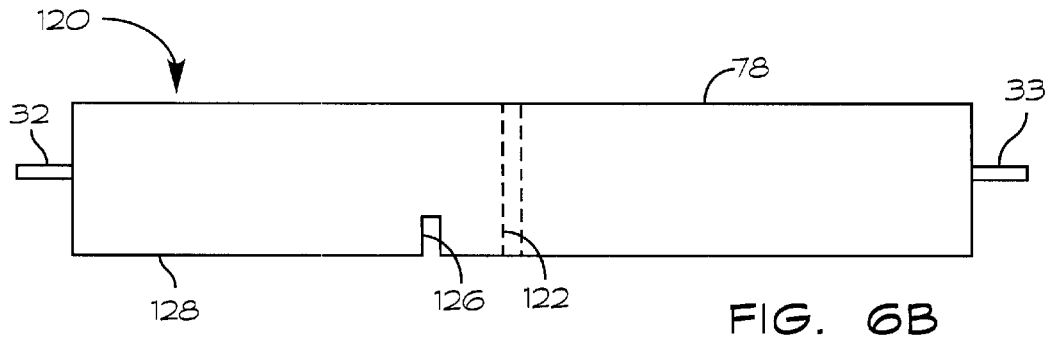
FIG. 6B

MULTIFUNCTION INTEGRATED OPTICS CHIP HAVING IMPROVED POLARIZATION EXTINCTION RATIO

BACKGROUND OF THE INVENTION

This invention relates generally to the field of integrated optics chips or devices and more particularly to the field of multifunction integrated optics chips such as those having integrated optic components formed on lithium niobate (LiNbO3) substrates. Integrated optics components formed on such chips include waveguides that may be arranged to function such as optical couplers and phase modulators. Multiple functions may be incorporated on a single device, which eliminates losses and errors associated with interfacing separate devices.

Multifunction Integrated Optical Chips (MIOC's) are usually fabricated in large numbers on three to four inch wafers of lithium niobate (LiNbO3) using conventional photomasks, vacuum deposition, chemical baths, proton exchange, diffusion and etching techniques to form large numbers of identical components at low cost and with high reliability. MIOC's capable of performing many functions such as polarization splitting/combining and modulating are used in fabricating middle and high accuracy fiber optic gyroscopes (FOG's) or rotation sensors. The FOG uses the Sagnac effect to measure rates of rotation about an axis perpendicular to a coil of optical fiber. MIOC's may also be used in forming other fiber optic sensors such as hydrophones or geophones that rely on the principles of the Mach-Zehnder or Michelson interferometer.

A fiber optic gyroscope includes means for introducing counterpropagating waves from an optical signal source into an optical fiber coil. Rotation of the coil about an axis perpendicular to the plane of the coil produces a phase difference between the clockwise and counter-clockwise wave via the Sagnac effect. The phase shift occurs because waves that traverse the coil in the direction of the rotation have a longer transit time through the optical fiber coil than waves that traverse the coil in the opposite direction. The waves are combined after propagating through the coil. This combination of waves produces an interference pattern that may be processed to determine the rate of rotation. Techniques for determining the rotation rate are well-known in the art.

It is common practice to form a FOG to include a multifunction integrated optics chip (MIOC) between the optical signal source and the optical fiber coil, which is typically formed of polarization maintaining fiber. The MIOC typically includes a plurality of optical waveguides arranged to form a Y-junction. The base of the Y-junction is connected to the optical signal source while the arms of the Y-junction are interfaced with ends of the optical fiber coil. Optical signals input to the multifunction integrated optics chip divide at the Y-junction to form optical signals that are input to the ends of the optical fiber coil as the counter-propagating waves. After propagating through the coil, the waves enter the optical waveguides that form the arms of the Y-junction. The waves then combine in the Y-junction and are output from the base of the Y-junction to an optical fiber. The combined waves are guided to a photodetector that produces an electrical signal that is processed to determine the rotation rate.

The desired condition in a fiber optic rotation sensor is the transverse electric (TE) mode propagating in the optical fiber coil and in the optical waveguides without added path lengths. Propagation of transverse magnetic (TM) modes and TE modes having added path lengths are undesired conditions. Error sources such as polarization cross coupling, which adds a phase shift (or polarization non-reciprocity, PNR, which is associated with always having two polarization components possible in the fiber at all times), manifest themselves as additional optical path differences in direct competition with the Sagnac effect. These error sources cause phase bias and amplitude bias errors when they are modulated at the frequency used by the phase modulators in the MIOC. The bias component in the fiber optic rotation sensor due to polarization cross coupling is inversely proportional to the square root of the absolute value of the polarization extinction ratio. Extinction ratio is defined as ten times the logarithm of the ratio of the undesired power (the power of the undesired mode) to the desired power (the power of the desired mode) of the polarization modes expressed in decibels. Minimizing cross coupling (maximizing the absolute value of the extinction ratio) in the MIOC reduces this type of bias error.

As further background, integrated optics chips, such as those disclosed herein may be formed using processes and steps similar to some of those disclosed in U.S. Pat. No. 5,193,136, which issued to Chin L. Chang et al. on Mar. 9, 1993 for PROCESS FOR MAKING MULTIFUNCTION INTEGRATED OPTICS CHIPS HAVING HIGH ELECTRO-OPTIC COEFFICIENTS; U.S. Pat. No. 5,046,808, which issued to Chin L. Chang on Sep. 10, 1991 for INTEGRATED OPTICS CHIP AND METHOD OF CONNECTING OPTICAL FIBER THERETO; U.S. Pat. No. 5,393,371, which issued to Chin L. Chang et al. on Feb. 28, 1995 for INTEGRATED OPTICS CHIPS AND LASER ABLATION METHODS FOR ATTACHMENT OF OPTICAL FIBERS THERETO FOR LiNbO$_3$ SUBSTRATES; U.S. Pat. No. 5,442,719, which issued to Chin L. Chang et al. on Aug. 15, 1995 for ELECTRO-OPTIC WAVEGUIDES AND PHASE MODULATORS AND METHODS FOR MAKING THEM; and U.S. Pat. No. 4,976,506, which issued to George A. Pavlath on Dec. 11, 1990 for METHODS FOR RUGGED ATTACHMENT OF FIBERS TO INTEGRATED OPTICS CHIPS AND PRODUCT THEREOF.

Each of the foregoing patents is assigned to Litton Systems, Inc. of Woodland Hills, Calif. Each of the foregoing patents cited above is incorporated herein by reference for the purpose of providing those skilled in the art with background information on how integrated optics chips or multifunction integrated optics circuits are made.

This invention is particularly directed to methods and apparatus for reducing polarization non-reciprocity errors in a MIOC as a result of both TM modes and TE modes that have traversed undesired optical paths and then coupled into an optical waveguide formed on the MIOC.

If the gyro bias is significantly reduced, there is the potential to reduce the fiber costs by replacing polarization maintaining fiber with less expensive single mode fiber, or using a shorter length of polarization maintaining fiber than is presently used. There is also the potential to support increased gyro accuracy.

SUMMARY OF THE INVENTION

The present invention is designed to extinguish or trap the various light paths that could potentially cross couple through reflections off the top, bottom and sides of an integrated optics chip.

The present invention addresses the problem of light scattered from more than one source including the pigtails, y-junction and other possible material or defect-induced sources along the waveguide. The new design also addresses the side reflected beam paths. This is of particular importance when the sides of the chip have an enhanced reflectivity due to either a polished surface or a coated surface leading to higher reflectivity over a ground or saw cut surface or due to a wide chip. The present invention results in a mechanically stronger product and is also more resilient to the handling due to normal processing. The present invention may also have an advantage with the completely sealed top surface preventing data errors at the gyro level due to data spikes from arcing as well as an improved yield due to handling during processing and installation.

An integrated optics chip according to the present invention comprises a substrate formed of an electrooptically active material and an optical waveguide network formed on a first surface of the substrate. The optical waveguide network has an input facet where an optical signal may be input to the optical waveguide network and an output facet where optical signals may be output from the optical waveguide network. The integrated optics chip also comprises a trench formed in the bottom surface and extending into the substrate toward the optical waveguide network to a depth of at least 70% of the thickness. The trench is arranged to prevent light rays incident thereon from inside the substrate from propagating to the output facet. In particular, the trench prevents light scattered at the input facet from reflecting from the bottom surface of the substrate to the output facet.

The integrated optics chip according to the present invention preferably further including a cover mounted to the top surface of the substrate. The cover preferably extends substantially the entire length of the substrate.

The integrated optics chip may include a plurality of trenches formed in the bottom surface and extending into the substrate toward the optical waveguide to depth of at least 70% of the thickness. The trenches may extend in the substrate to about 95% of the substrate thickness.

The integrated optics chip according to the present invention may further include one or more grooves formed in a side of the substrate and cover.

The integrated optics chip according to the present invention may further including a light absorbing material in the trench and in the grooves.

The integrated optics chip according to the present invention preferably further comprises an electrode pattern formed on the top surface of the substrate adjacent the optical waveguide network and a plurality of access electrodes formed on sides of the substrate and cover to provide electrical signals to the electrodes.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 1A is a perspective view of a prior art MIOC;

FIG. 1B is a bottom plan view of the MIOC of FIG. 1A;

FIG. 1C is a side elevation view of the MIOC of FIGS. 1A and 1B;

FIGS. 2A–2C side elevation views illustrating prior art MIOCs designed to block single reflections;

FIG. 3 is a side view of a MIOC according to the present invention arranged to block multiple reflection ray paths;

FIG. 4 is a side elevation view of a prior art MIOC;

FIG. 5 is a side elevation view showing comparisons of the thicknesses of an MIOC according to the present invention and the prior MIOC of FIG. 4;

FIG. 6A is a side view illustrating sample ray traces for reflected rays in an MIOC according to the present invention;

FIG. 6B is a top plan view of the MIOC of FIG. 6A;

DETAILED DESCRIPTION OF THE INVENTION

Figure 7:
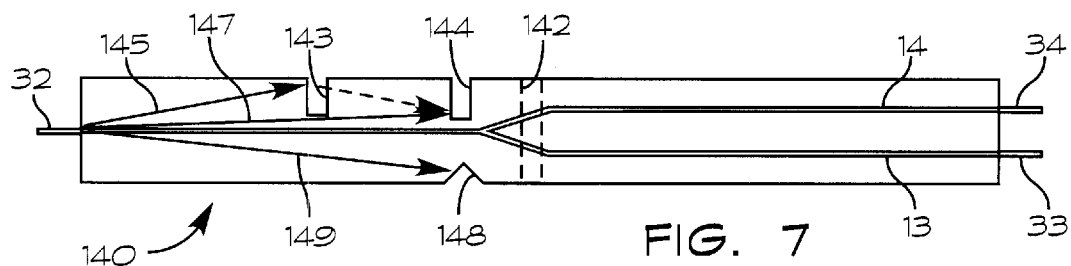
FIG. 7 is a top plan view showing side trenches in a an MIOC according to the present invention.

None of the drawings of the apparatus described in this disclosure are to scale. Some of the dimensions of components included in the drawings are so small that they must be shown in an enlarged scale relative to other components.

FIG. 1A illustrates a first prior art MIOC 10 that includes three optical waveguides 12–14 formed on a substrate 16. The substrate 16 is formed of an electrooptically active material such as lithium niobate, LiNbO$_3$, which is ordinarily used in forming such devices. The optical waveguides 12–14 are formed by doping portions of the substrate 16 using processes that are well-known in the art.

The optical waveguide 12 extends from an edge 18 of the substrate 16 to a Y-junction 20 where the optical wavegides 12–14 intersect. The optical waveguides 13 and 14 have angled portions 22 and 24, respectively, that extend between the Y-junction 20 and parallel portions 26 and 28. The optical waveguides 13 and 14 extend between the Y-junction 20 and an edge 30 of the substrate 16, the end faces 18 and 30 being generally parallel.

The optical wavegides 12–14 are formed such that optical fibers 32–34, respectively, may be butt-coupled to them to interface the MIOC 10 with other components (not shown). To facilitate describing both the prior art and the invention, the optical fiber 32 is subsequently referred to as the input fiber pigtail 32, and the optical fibers 33 and 34 are referred to as the output fiber pigtails 33 and 34.

A pair of feet 36 and 38 are mounted on the upper surface 40 of the substrate 16 near the ends 18 and 30, respectively.

The MIOC 10 is designed to block single bounce reflections off the lower surface 42 of the substrate 16. For example if an optical signal is input to the MIOC 10 from the input fiber pigtail 32, most of the signal input propagates in the optical waveguide 12 to the Y-junction 20 and couples to the optical waveguides 13 and 14, which in turn couple through the output fiber pigtails 33 and 34. However, a small portion of the signal from the input fiber pigtail 32 propagates in the substrate 16. There is an angle of incidence for light that reflects from the lower surface 42 of the substrate 16 for which the reflected ray propagates to the edge 30 where the light propagates to the output fiber pigtails 33 and 34, which are coupled to the optical waveguides 13 and 14. The angle depends upon the dimensions of the MIOC 10 and is easily calculated once the length and thickness of the MIOC are known. Typical MIOC's are about 26 to 28 mm long, 2 mm wide and 1 mm thick.

Ray paths having a single reflection from the lower surface 42 are blocked by three shallow trenches, or grooves, 44–46 formed in the MIOC. These trenches 44–46 are located in the central region of the substrate 16 where a ray would have to reflect to reach the output of the MIOC 10. As shown in FIGS. 1A–1C, the trenches 44–46 are parallel, and they extend across the substrate 16 in a direction approximately perpendicular to the optical path defined by the optical waveguides 12–13. Typically the trenches 44–46 are 0°–15° from perpendicular to the optical path defined by the optical wavegides 12–14. The trenches 44–46 typically extend about 50 to 300 microns from the lower edge 42 into the substrate 16. Typically the trenches 44–46 have depths that are significantly less than half the height of the substrate 16. The trenches may be filled with a substance such as India ink to enhance suppression of undesired light rays.

A light ray that is incident upon a side of the trench 44 is reflected at an angle that will not allow the ray to reach the pigtail, input or output, of the MIOC 10. Part of the light may also be absorbed. The MIOC 10 has an extinction ratio in the range of about −55 to −65 dB.

FIG. 2A illustrates a MIOC 60 having three trenches 62–64 equally spaced apart at the ¼, ½ and ¾ points with respect to the length of the MIOC. FIG. 2B shows still another type of prior art MIOC 65 having a single trench 66 at the center bottom region. Both of these designs can be fabricated with or without feet 59, 61.

FIG. 2C illustrates rays 68A and 68B propagating from an input facet 67 of the MIOC 60 toward the bottom surface 69. The trench 62 blocks the ray 68B, and the trench 63 blocks the ray 68A. Again, this design can be fabricated with or without feet 59,61.

The prior art does not address reflections from the sides or reflections involving both the sides and bottom of the chip combined, and it is limited by the structural integrity of the chip. The prior art addresses only the two simplest optical paths for scattered light starting at one pigtail interface and ending at an opposite pigtail.

It has been discovered that further improvement in the MIOC extinction ratio requires blocking of rays other than these two simplest ray paths which make single and triple bounces off the top 40 and bottom 42 surfaces of the substrate 16.

FIG. 3 is a side elevation view of a MIOC 70 according to the present invention. The MIOC 70 is formed in a substrate 72 in the manner described above and has optical wavegides 12–14 formed thereon as described above and shown in FIG. 1A. The substrate 72 preferably has a thickness of about 1000 microns. The MIOC 70 has a single trench 74 formed in the central bottom portion 76 of the substrate 72. The trench 74 preferably has a depth in the range of about 700 to 950 microns and a width of about 0.003 in. to 0.012 in. Therefore, the depth of the trench 74 is preferably about 70% to 95% of the thickness of the substrate 72. The MIOC 70 further includes a cover 78 that is also preferably formed of LiNbO$_3$. The cover 78 is preferably a block having rectangular outer surfaces and a thickness of about 1000 microns, or the same thickness as the substrate 72. The cover 78 provides additional structural integrity to prevent the MIOC 70 from breaking where the trench 74 is formed. Other embodiments include the use of a 500 micron thick cover 78.

The trench 74 in MIOC 70 blocks light rays having single and triple reflections off the bottom surface 80 and top surface 106 and also blocks light from scatter sources within the MIOC 70 including the optical wavegides 12–14. In FIG. 3, the arrows formed of solid lines represent rays of stray light in the MIOC 70. The dashed arrows represent the paths that rays incident upon the side 82 of the trench 74 would have followed if they were not blocked by the trench 74.

The arrows 84 and 85 represent light that is scattered into the MIOC 70 at the input facet 86. The ray 84 follows a path in which it would reach the output facet 88 after a single reflection from the bottom surface 80 if the ray were not blocked by the trench 74. The arrow 85 represents a triple reflection path that would lead to the output facet 88 but for the blocking action of the trench 74.

The arrows 90 and 92 represent light rays that enter the MIOC 70 from a scatter source 94 in the optical waveguide 12, 13, 14, or the Y-junction 20. These rays are blocked by the trench 74, but would not be blocked by the trenches in the prior art devices described above.

The arrows 100–102 represent still other light rays that enter the MIOC 70 from another scatter source 104. Only rays hat pass over the inner end 108 of the trench 74 can reach the outputs of the MIOC 70.

FIGS. 4 and 5 show a comparison of the thicknesses of the typical prior art trenched MIOC 10 and the MIOC 70 at the thinnest portions. Because of the cover layer 78, the thickness $t_1$ of the MIOC 70 where the trench 74 is formed is about 1050 to 1300 microns. In contrast the thickness $t_2$ of the prior art MIOC 10 is typically about 700–950 microns. The greater thickness of the MIOC 70 makes it more mechanically stable than the prior art device.

FIG. 6A is a side elevation view of a MIOC 120 constructed according to the principles of the present invention. As in FIG. 3, the MIOC 120 in FIG. 6A includes a central trench 122 in the substrate 72 of the MIOC 120 under the optical wavegides 12–14 as described above with reference to FIG. 1A. As shown in FIGS. 6A and 6B, the MIOC 120 also includes a groove 126 formed in a side 128 of the MIOC 120. The side groove 126 extends across both the substrate 72 and the side of the cover 78. The bottom trench 122 has a depth of about 700 to 950 microns. The side groove 126 extends into the substrate 72 approximately 50–500 microns, traversing the entire height of the MIOC 120.

FIG. 7 is a top plan view illustrating a MIOC 140 according to the present invention having a central bottom trench 142 and a plurality of side grooves 143–144. The trench 142 is similar to the trench 122 shown in FIG. 6. The side grooves block rays that reflect from the sides of the MIOC 140. For example, a ray 145 from the input fiber pigtail 32 will be blocked by the side groove 143. A ray 147 that misses the side groove 143 will be blocked by the side groove 144. A ray 149 will be blocked by the bevel 148. The MIOC 140 may also include one or more bevels 148. The bevels 148 are formed by forming a "V" shaped cross section groove in the surfaces of the MIOC 140. The side bevels or trenches and the bottom trenches may or may not be co-located in the same plane. Different locations will require different width and depths of the side and bottom trenches. The preferred locations for side and bottom trenches are dependant upon the IOC design length, width and thickness.

Figure 8:
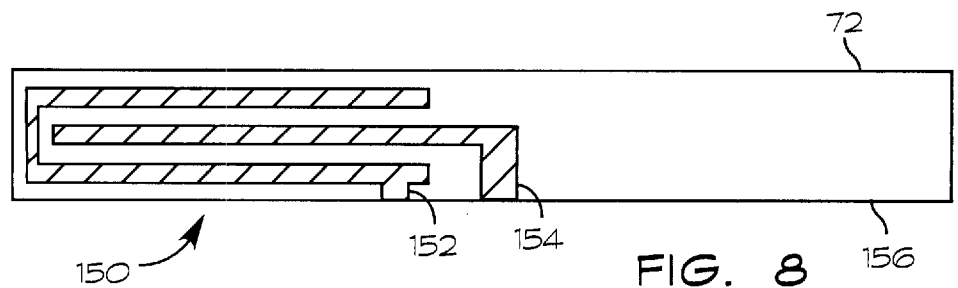
FIG. 8 is a top plan view showing a pattern of electrodes that may be formed on the MIOC according to the present invention.

FIG. 8 is a top plan view of the substrate 72 on which the optical waveguides 12–14 (not shown in FIG. 8) are formed.

Figure 9:
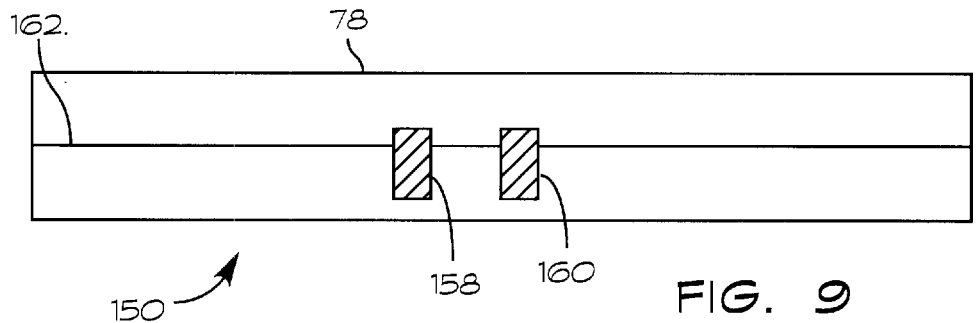
FIG. 9 is a side view showing electrodes on a MIOC according to the present invention accessed through the bond line between the MIOC and a cover.

FIG. 8 shows an electrode pattern 150 suitable for use with a MIOC constructed according to the present invention. Electrode pads 152 and 154 extend to an edge 156 of the substrate. FIG. 9 is a side view showing electrical contacts 158 and 160 arranged to access the electrode pattern 150 through the bond line 162 between the substrate 72 and the cover 78.

Electrical accessibility of the device has been proven possible through the cut side of the chip when diced after the full cover 78 has been attached. This gives the added benefit of preventing surface contamination of the integrated optic chip, and it prevents electrical discharges across its face when using the nonconductive epoxy at the interface as is currently done with the feet. This method could be utilized on other integrated optical devices where polarization cross coupling, PNR, contamination, or strength of the device is an issue.

An important feature in the design of this invention is the extreme depth of the trench. The trenches in the MIOC's according to the present invention are approximately 700–950 microns in depth, which approaches the optical waveguide structure. The total depth of the device without the cover is 1000 microns. This deep trench design will block many more reflections than the typical 50–300 micron depth trenches currently in use. Without the foot being the entire length of the chip, this design would not be feasible, since the resultant chip would be so fragile that it should not stand up to the handling, temperature, mechanical shock or vibration requirements.

Figure 10:
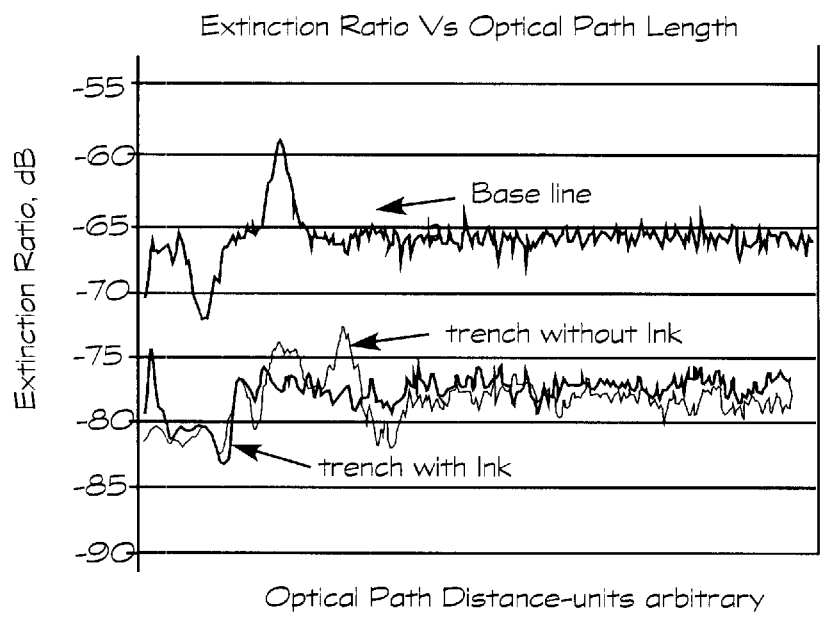
FIG. 10 graphically illustrates the effects of a 950 $\mu$m trench on the extinction ratio of a MIOC.

FIG. 10 graphically illustrates the effect of a 950 μm deep trench on the extinction ratio of the MIOC 70 of FIG. 3. The upper graph represents the baseline extinction ratio of a conventional MIOC that does not have a trench. The baseline extinction ratio is seen to be about −58 dB. Of the two lower lines, the dark line graph represents the extinction ratio of the MIOC 70 with the trench 74 filled with India ink. The lighter line represents the extinction ratio of the MIOC 70 with the trench 74 without any absorbing material added. The extinction ratio improves to about −74 dB for the 950 μm deep trench 74 filled with India ink and to about −73 dB for the trench 74 alone.

Figure 11:
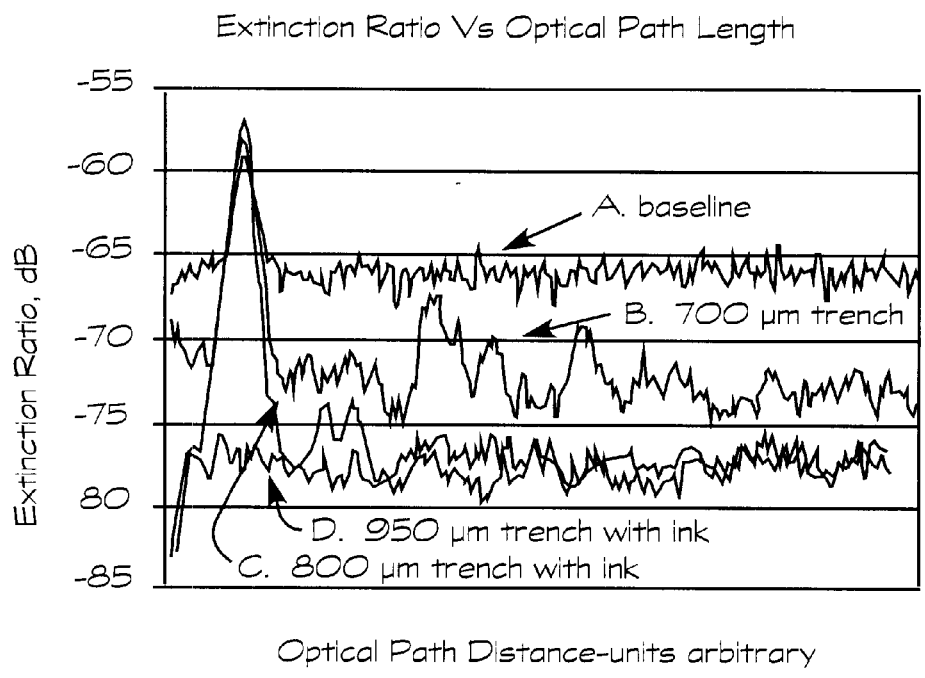
FIG. 11 graphically illustrates the effects of trench depth on the extinction ration of a MIOC.

FIG. 11 graphically illustrates the effect of increasing trench depth on the extinction ratio. The baseline extinction ratio is about −57 dB for a single trench having a depth of 200 μm. The extinction ratio improves to about −58 dB when the trench depth is increased to 700 μm. Increasing the trench depth to 800 μm resulted in another small improvement to about −59 dB. At a trench depth of 950 μm there is a dramatic improvement in the extinction ratio to about −76 dB.

Figure 12:
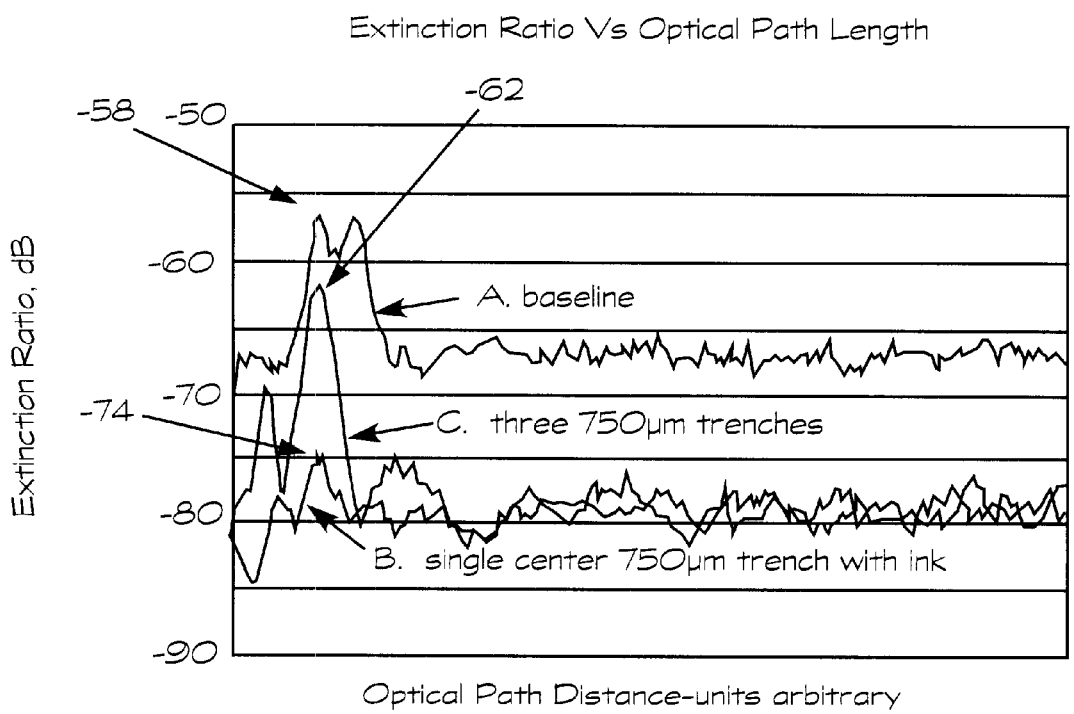
FIG. 12 graphically illustrates the effects of single and multiple cut trenches at a depth of 750 $\mu$m.

FIG. 12 graphically illustrates the effect of single versus multiple trenches having a depth of 750 μm. The chip initially had a polarization extinction ratio of −58 dB. Adding a single center trench of 750 microns in depth improved the polarization extinction ratio to −74 dB. Two additional trenches degraded the polarization extinction ratio to −62 dB.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An integrated optics chip, comprising:
   a substrate formed of an electrooptically active material;
   an optical waveguide network formed on a first surface of the substrate, the optical waveguide network having an input facet where an optical signal may be input to the optical waveguide network and an output facet where optical signals may be output from the optical waveguide network; and
   the substrate having a trench formed in the bottom surface and extending into the substrate toward the optical waveguide network to a depth of at least 70% of the thickness, the trench being arranged to prevent light rays incident thereon from inside the substrate from propagating to the output facet.

2. The integrated optics chip of claim 1 further including a cover mounted to the top surface of the substrate.

3. The integrated optics chip of claim 2 wherein the cover extends substantially the entire length of the substrate.

4. The integrated optics chip of claim 1, wherein the trench prevents light scattered at the input facet from reflecting from the bottom surface of the substrate to the output facet.

5. The integrated optics chip of claim 1 wherein the trench prevents light scattered from scatter points between the input facet and the trench from reflecting from the bottom surface of the substrate to the output facet.

6. The integrated optics chip of claim 1 wherein the trench is perpendicular to the plane of the substrate and centered along the length thereof.

7. The integrated optics chip of claim 1 wherein the cover has approximately the same dimensions as the substrate.

8. The integrated optics chip of claim 1 wherein the cover has a thickness that is less than the thickness of the substrate.

9. The integrated optics chip of claim 1 wherein the cover has a thickness that is greater than the thickness of the substrate.

10. The integrated optics chip of claim 2 including a plurality of trenches formed in the bottom surface and extending into the substrate toward the optical waveguide to depth of at least 70% of the thickness.

11. The integrated optics chip of claim 2 further including a groove formed in a side of the substrate and cover.

12. The integrated optics chip of claim 2 further including a plurality of grooves formed in side surfaces of the substrate and cover.

13. The integrated optics chip of claim 1, further including a light absorbing material in the trench.

14. The integrated optics chip of claim 11, further including a light absorbing material in the groove.

15. The integrated optics chip of claim 1, further comprising:
   an electrode pattern formed on the top surface of the substrate adjacent the optical waveguide network; and
   a plurality of access electrodes formed on sides of the substrate and cover to provide electrical signals to the electrodes.

16. An integrated optics chip, comprising:
   a substrate formed of an electrooptically active material;
   an optical waveguide network formed on a first surface of the substrate, the optical waveguide network having an input facet where an optical signal may be input to the optical waveguide network and an output facet where optical signals may be output from the optical waveguide network;
   the substrate having a trench formed in the bottom surface and extending into the substrate toward the optical waveguide network to a depth of at least 70% of the thickness, the trench being arranged to prevent light rays incident thereon from inside the substrate from propagating to the output facet;

an electrode array formed on the first surface of the substrate;

a cover mounted to the first surface of the substrate over the optical waveguide network and the electrode array; and a plurality of access electrodes located on a side of the substrate and cover to provide electrical signals to the electrode array.

17. The integrated optics chip of claim 16, further comprising a light absorbing material inside the trench.

18. The integrated optics chip of claim 16 further including a groove formed in a side of the substrate and cover.

* * * * *